United States Patent [19]
Sommer

[11] 3,960,369
[45] June 1, 1976

[54] STIRRING MECHANISM

[76] Inventor: Warren T. Sommer, 17130 Sunset, Detroit, Mich. 48212

[22] Filed: June 20, 1974

[21] Appl. No.: 481,028

[52] U.S. Cl. .................................. 259/111; 99/348
[51] Int. Cl.² ..................... B01F 7/20; A47J 43/04; A47J 43/07
[58] Field of Search ................. 259/21, 40, 64, 111, 259/114, 116, 118, 5, 102, DIG. 35; 74/527; 99/348

[56] References Cited
UNITED STATES PATENTS

| | | | |
|---|---|---|---|
| 1,133,168 | 3/1915 | Mitchell-Colson | 99/348 X |
| 2,032,678 | 3/1936 | Wegener | 259/102 |
| 2,768,768 | 10/1956 | Cornell et al. | 74/527 X |
| 3,410,536 | 11/1968 | Sommer | 259/111 |
| 3,714,843 | 2/1973 | Bracey | 74/527 |
| 3,810,605 | 5/1974 | Lambert | 99/348 X |

*Primary Examiner*—Robert W. Jenkins
*Assistant Examiner*—James A. Niegowski
*Attorney, Agent, or Firm*—Cullen, Settle, Sloman & Cantor

[57] ABSTRACT

A mechanical stirring device for agitating and mixing fluids in a container, such as a cooking pot or pan, includes a self-contained drive mechanism which is releasably attachable to a stirrer element projecting into and resting on the bottom of the container. The drive mechanism includes a rotatable drive element which seats on the edge of the container rim to impart motion to the entire stirring device about a vertical axis through the midpoint of the container. The stirrer element includes a main frame member having a pair of spaced, generally parallel uprights and a mixing frame region. A pair of lateral stabilizer legs is attached to the stirrer frame and rests on the bottom of the container to laterally stabilize the stirring device as it rotates about the container axis. A wiper element in the shape of an inverted-V is also attached to the stirrer frame and rests on the container bottom to agitate and skim fluid from the container bottom to prevent scorching. The drive mechanism further includes a pair of beveled surfaces which are insertable between knurls on the uprights to provide a quick-attachment, quick-release feature.

13 Claims, 5 Drawing Figures

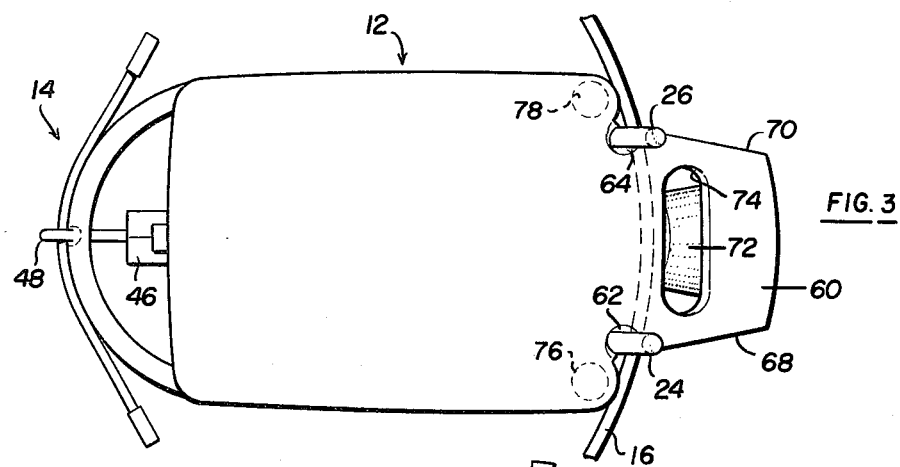
FIG. 3
FIG. 2
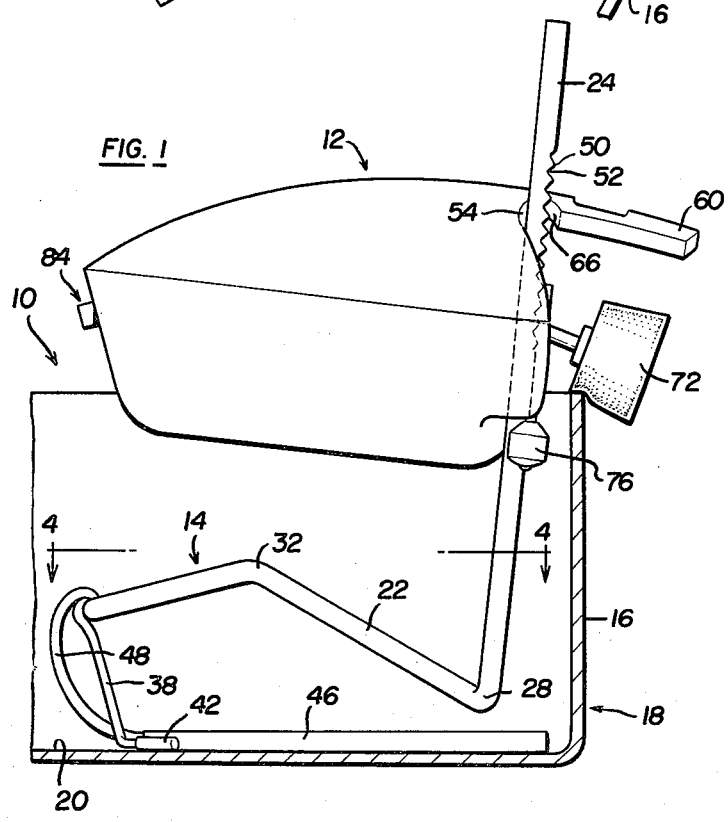
FIG. 1
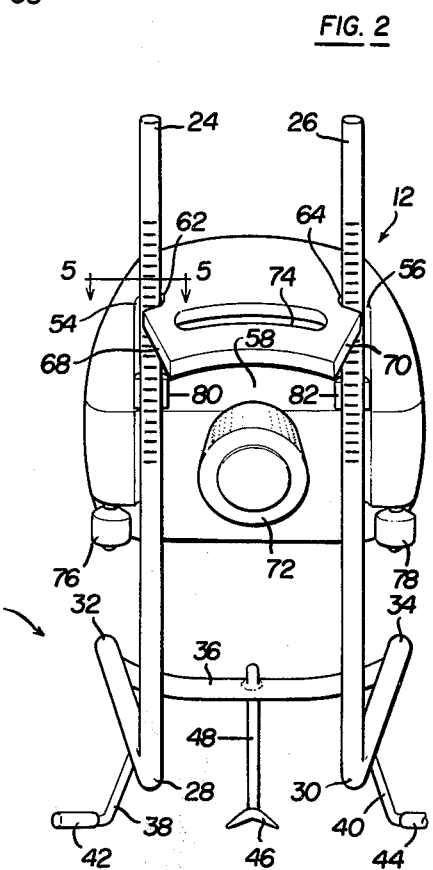
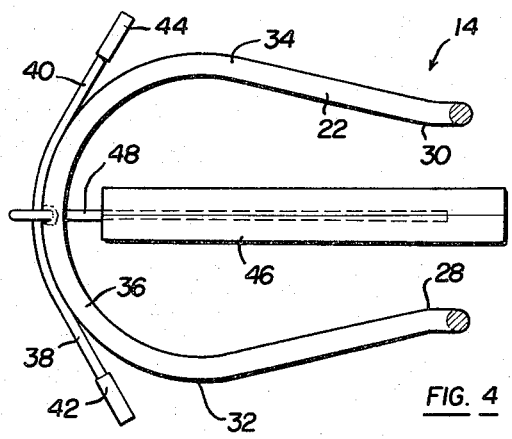
FIG. 4
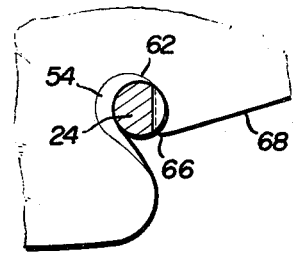
FIG. 5

STIRRING MECHANISM

BACKGROUND OF THE INVENTION

1. Field of the Invention

The present invention relates to a stirring mechanism, and more particularly to a stirring mechanism which can be placed in a cooking pot or pan to automatically mix the food or fluid being prepared.

2. The Prior Art

Many foods, such as puddings, custards, soups, sauces, gravy, creamed corn and oatmeal, either require stirring over lengthy periods of time during cooking or require premixing. Therefore, one must constantly attend to these particular type goods during preparation at which time other foods are more than likely being simultaneously prepared. As a result, the person who is preparing these foods must either wait to prepare other foods or run the risk of improper mixing or scorching. The presently proposed invention overcomes these problems through the provision of a mechanized stirring device which can easily be attached to a cooking pot or pan and left unattended to properly mix and stir the foods under preparation.

The most common stirring devices shown by the prior art, for example U.S. Pat. Nos. 3,251,581, 3,112,917, 2,831,663, and 2,032,678, include a drive member which is suspended on the container rim to drive a rotating or oscillating blade or paddle. In particular, U.S. Pat. Nos. 2,831,663 and 2,032,678 do not suggest a commercial mixing device which will traverse the rim of a container to provide constant mixing of the foods under preparation within the entire confines of the container. Other prior art patents include U.S. Pat. Nos. 2,732,185 and 2,456,981 which disclose agitating means for domestic cooking utensils. However, none of the mixing devices disclosed by the previously discussed prior art patents provide the advantages of the present invention, as will become apparent from the detailed description of the invention.

The prior art further includes Applicant's U.S. Pat. No. 3,410,536 which discloses a self-contained drive unit for attachment to the rim of a cooking container and a stirring element attached to the drive unit. The present invention, which is an improvement over the device disclosed by U.S. Pat. No. 3,410,536, enables several further advantages to a user and also enables a wider range of foods to be stirred without an agglomerating effect on the stirrer element.

SUMMARY OF THE INVENTION

The mixing apparatus proposed by the present invention relates to a mechanized mixing unit which can be positioned on the rim of a container to agitate or mix fluids within the container. This mixing unit is particularly suitable for use with home cooking utensils such as pots and pans but may be utilized in any situation where a container is employed having a rim or sidewall to which the mixing assembly can be attached.

The mixing apparatus includes a self-contained drive unit and a stirrer implement which can be releasably interlocked together. The stirrer implement includes a mixing frame having a pair of spaced, parallel upright members projecting out of the container and releasably interlocking with the drive unit. Each upright member includes a plurality of vertically spaced knurls defining a plurality of vertically spaced indents which can accomodate beveled interlocking surfaces defined on the drive unit so that the stirrer assembly can be utilized with a variety of container sizes and container depths.

The stirrer implement further includes a stirrer frame region integrally formed with the upright members and spaced from the bottom of the container. This region of the stirrer implement provides an agitating or mixing of the fluids at different vertical levels within the container and permits chunky foods to be pass between the stirrer frame member and the bottom of the container to eliminate agglomerating or build-up during the mixing action.

A pair of stabilizer legs depends from the stirrer frame and rests on the container bottom to stabilize the entire mixing assembly against lateral displacement during its traverse of the container. The stabilizing legs include horizontal terminal ends, which in preferred embodiment include an antifriction sleeve or coating. These horizontal terminal ends provide both stabilization and mixing action of the fluids.

The stirrer implement further includes a wiper element depending from the stirrer frame and contacting the bottom of the container. The wiper element includes an elongated component having an inverted-V cross-sectional configuration extending generally from the container sidewall radially toward the center of the container. The terminal edges of the inverted-V configuration contact the container bottom to skim fluids therefrom to prevent scorching and to direct the skimmed fluids upwardly to intermix with the upper portions of the fluid being intermixed.

The self-contained drive unit includes a rotary drive element in the form of a wheel which rests on the rim of the container and rotates to drive the entire stirring assembly around the periphery of the container. The drive unit further includes grooves which accomodate the pair of stirrer implement uprights. A portion of these grooves are partially defined by indents within a hood projection extending from the drive unit proper. The grooved portion defined by the hood includes beveled or tapering surfaces which seat into the upright indents to mechanically interlock the drive unit to the stirrer implement to provide a quick-attachment, quick-release feature.

The hood projection is configured in preferred embodiment to taper toward its terminal end to define a pair of lateral camming surfaces to facilitate the insertion of the stirrer uprights into the drive unit grooves. The width of the hood at its terminal end is approximately the same as the spacing between the stirrer uprights such that the hood may be manually inserted between the uprights. As the user further inserts the hood between the uprights, the uprights are spread apart since they are resilient to a certain degree; then upon full insertion of the hood the uprights snap into the grooves of the drive unit. The beveled or tapering surfaces on the hood then may be properly positioned within the desired upright indents with the drive wheel being positioned on the rim of the container to ready the stirring assembly for use. With the stirrer assembly being in this position, the self-contained drive unit is energized to rotate the drive wheel and thereby effect movement of the stirrer assembly within the container to mix and agitate the fluids or foods being prepared.

BRIEF DESCRIPTION OF THE DRAWINGS

FIG. 1 is a side elevation of the stirring assembly proposed by the present invention as it would be posi- FIG. 2 is a front elevational view of the mixing apparatus of the present invention.

FIG. 3 is a top plan view illustrating the mixing assembly.

FIG. 4 is a sectional view through line 4—4 of FIG. 1.

FIG. 5 is an enlarged fragmentized view along line 5—5 in FIG. 2 illustrating the interlocking relationship between the drive unit and the stirring implement.

DETAILED DESCRIPTION OF THE INVENTION

The present invention relates to a mixing assembly 10 which includes a self-contained drive unit 12 and a stirring member 14. The assembly is particularly adaptable for attachment on the side wall 16 of a container 18, such as a cooking pot or pan, with the stirrer implement 14 projecting into the container and engaging the container bottom surface 20 to mix the food or fluid being prepared.

The stirring member 14 comprises a first component 22 which in preferred embodiment is formed from a one-piece 3/16 steel rod coated with a high temperature epoxy using standard powder coating techniques. The rod is bent in several regions to define various distinct sections. One of these sections is the two generally parallel uprights 24 and 26 which are slightly inclined (from about 5°–7° is preferred embodiment) relative to the vertical plane perpendicular to the plane of FIG. 1. The upright members terminate at their lower ends in bent rod segments defining elbows 28 and 30, as best illustrated in FIG. 2. The remaining portion of the bent rod forms the mixing frame region which serves to aid in stirring the food or medium being agitated. As illustrated in FIGS. 1, 2 and 4, the mixing frame portion includes several curves and compound curves. Starting at each elbow, the rod is bent to project upwardly and outwardly to a second pair of less-pronounced elbow regions 32 and 34, where the rod is then bent inwardly and downwardly to form a generally U-shaped inner portion 36, as best illustrated in FIG. 4. The particular shape of the mixing frame region is not critical to the functioning of the overall assembly, but it is desireable to choose a configuration which yields mixing at several different levels in the container. Thus, this is one of the reasons for the upward and downward projecting regions which can best seen in FIGS. 1 and 2. Even though the stirrer implement 22 to this point has been described as being a one-piece member, this portion of the stirring device could be made from several different pieces or elements to provide the overall desireable features which result from the presently proposed invention.

It should further be noted from FIGS. 1 and 2 that the component 22 does not contact the container bottom. It has been found desireable through testing and experimentation to prevent this portion of the stirring element from contacting the bottom surface to permit chunky morsels, such as in beef stew, to pass through the stirring element rather than accumulating and establishing a damming effect, which would cause the food to ride around in the container with the stirring implement rather than being mixed. Thus, the stirring implement 22 is bent upwardly and downwardly not only to provide a mixing of the fluids at different levels as previously discussed, but the raised portion in the region of elbows 32 and 34 further enable chunky foods to pass through the stirring implement.

The entire stirring apparatus is laterally stabilized by a pair of stabilizer legs 38 and 40 which depend from the stirring frame in the region of U-shaped inner portion 36. It can best be seen from FIG. 2 that the stabilizer legs terminate in generally horizontal end portions which are optionally covered with a plastic or Teflon sleeve having a relatively low coefficient of friction. The remaining portion of the stabilizer legs are formed from a high yield point steel wire which is relatively rigid to resist tilting of the mixing apparatus. The length of the stabilizer legs should be chosen to take into consideration two primary factors: first, the terminal end portion of the stabilizer legs should be long enough to provide adequate lateral stabilization; but, second, the length of the terminal portion should not be too great to create an accumulation or agglomoration of food as the mixing apparatus traverses the container bottom surface. The stabilizer legs are also coated with a high temperature epoxy in the same operation as the coating applied to the stirrer frame assembly formed by the one-piece steel rod.

The stirrer implement further includes a wiper 46 which is connected to the stirrer frame by a wiper spine 48. As illustrated in FIG. 1, the wiper spine is connected to the central portion of the U-shaped mixing frame 36 and is arcuately formed to project first forwardly of the mixing frame then downwardly to position the wiper centrally beneath component 22. In the preferred embodiment, the wiper spine is formed from a 1/16 inch high yield point steel wire which is relatively flexible to permit the wiper to rest firmly against the bottom wall of the container. As illustrated in FIG. 4, the wiper spine projects through the majority of the length of the wiper element as a form of reinforcement. The wiper spine does not extend entirely through the wiper component 46 so that the end portion of the wiper nearest the container sidewall may resiliently deform to assume the shape of a curving configuration which some containers have in the region between their bottom surface and sidewall.

As best illustrated in FIG. 2, the wiper component 46 has an inverted-V configuration defining a pair of inclined surfaces terminating in edges which contact the bottom of the container. This particular configuration has been found highly desirable to skim fluids from the bottom of the container and give them an upward lift component for mixing and agitation. In the preferred embodiment, the wiper component is formed of a molded rubber having a fabric covering. In the specific preferred embodiment the fabric covering is a fiberglass fabric having a mechanically bonded Teflon coating. The wiper is formed by impregnating a silcon rubber into the fiberglass of the fabric during the molding and forming process.

In the preferred embodiment, the drive unit 12 is formed of a housing as illustrated, which encloses a battery operated D.C. motor for supplying rotary power output to a drive wheel 72. The battery may be powered either by replaceable or rechargeable batteries. The drive wheel may be formed from any material exhibiting a high coefficient of friction for driving the stirring apparatus around the container rim; in the preferred embodiment the drive wheel is formed from a foam rubber material.

The uprights 24 and 26 of the stirrer implement are provided with a plurality of knurls 56 to define a plurality of upright indents 52 for providing a quick-attachment, quick-release interlock with the drive unit 12 of the apparatus. The interlock feature on the drive unit includes, first, a set of grooves 54 and 56 in the face 58 of the drive unit to accomodate the stirrer uprights. The remainder of the interlock feature is formed as a portion of a hood 60 which projects from the drive unit housing and includes indents 62 and 64 complementing the upper portions of the grooves 54 and 56 in the region of the intersection between the hood and the body of the drive unit. These indents on the hood include beveled or tapering surfaces 66 which seat into and interlock with an appropriate set of uprights indents. The beveled tapering surfaces are in the form of a triangular protuberance from the hood indents and should be sufficiently and properly angularly shaped to seat into the upright indents and thereby interlock the drive unit with the stirrer elements.

The hood tapers in width away from the indent grooves to define a pair of laterally spaced camming surfaces 68 and 70. It can be seen from FIG. 2 that the width of the hood at its terminal end is approximately the same as the spacing between the stirrer uprights to facilitate the quick-attachment feature between the uprights and the drive unit. Specifically, to position the drive unit on the uprights as illustrated in FIGS. 1 and 2, a user would place his hand or fingers on the upper, right (as illustrated in FIG. 1) portion of the uprights above the knurls. Next, he or she would grasp the body portion of the drive unit and push the hood through the uprights. The tapering camming surfaces 68 and 70 serve to spread the uprights until the drive unit is fully inserted into the stirring element such that the uprights snap into the grooves and indents 54, 56 and 62, 64. At this point, the user should have the hood end of the drive unit tilted slightly downwardly so that the uprights may freely slide through the drive unit grooves without the beveled surfaces 66 seating within the uprights indents 52. The drive unit is then lowered into position to properly rest on the sidewall of the container with wheel 72 becoming seated on the rim of the container. A slot 74 is optionally provided in the hood 70 to enable the user to more easily view the seating of the wheel 72 of the container rim. Once the wheel seats on the rim, the user must then simply release the drive unit and permit the beveled surfaces to engage the upright indents for mechanically interlocking the two components together. Further, upon release of the drive unit the assembly will become properly positioned as rollers 76 and 78 come to rest on the sidewall of the container, as illustrated in FIG. 3. The length of the grooves 54 and 56 in the face of drive unit 58 should also be formed so that they will rest upon the uprights when in position for operation. The region of contact on the grooves may optionally include rubber or similar inserts 80 and 82, if necessary, to further assist in vertically stabilizing the drive unit on the uprights; however it is to be understood that the inserts can be eliminated.

FIG. 5 illustrates an enlarged fragmentized view of the region where the beveled surface 66 of the hood 60 engages an indentation on a stirrer upright. As can be seen by that Figure the upright is in engagement with the drive unit in the regions of the groove contact points and tapering edges 66 of the hood. FIG. 5 also illustrates that the opening defined between groove 54 and beveled surface 66 is greater than the diameter of the upright in order to allow the drive unit to be tilted for vertical positioning relative to the upright, as previously discussed.

Various parameters should be taken into account and implemented in order to achieve a workable unit in a wide variety of pan sizes. First, the horizontal terminal ends of the stabilizing legs should approximately straddle the center of the largest diameter pot or pan in which the appliance will be utilized. Second, the total spread of the contacting areas of the stabilizing legs should be roughly half the diameter of the largest pan. Further, the center of gravity of the mechanical unit should preferably be positioned such that approximately equal amounts of weight are supported by the drive wheel's engagement with the container rim and by the engagement of the stabilizers legs with the container bottom. As illustrated in FIG. 1, the drive wheel 72 should be in the form of a cone to provide an additional interlocking feature between the drive unit and the container to prevent disengagement between these two components. Also as illustrated in FIG. 1, the drive shaft for drive wheel 72 should slope slightly downwardly away from the drive unit 12 to cooperate with the mechanical shape of the drive wheel surface to provide an angle of approximately 20° or more between the horizontal and the drive wheel surface at the point where it contacts the rim of the pan. It should be understood that these parameters are desireable for optimal operation of the stirrer apparatus and are not critically essential to its operation.

With the stirring apparatus assembled and positioned as illustrated in FIG. 1, the battery operated motor within the self-contained drive mechanism 12 can be energized by turning on a switch, such as illustrated by reference numeral 84, to thereby acutate the stirring assembly for unattended mixing of the fluid or food being prepared. After use, the drive unit is disengaged from the stirrer by simply tilting the "switch end" of the drive unit upwardly to disengage the beveled surfaces 66 from the upright indent and then raising the drive unit to allow the uprights to slide through and out of the space between the grooves and indents.

It is to be understood that the previously described apparatus is merely exemplary of the overall aspects of the present invention and are not intended to be limiting.

Having fully and completely described my invention, I claim:

1. A mechanical stirring device for mixing fluids in a container having a bottom surface and a sidewall terminating in a rim, the stirring device being capable of use in containers substantially differing in size, both in height and diameter, including: a drive unit having a rotary drive member engaging the rim of the container to impart motion to the stirring device within the container, wherein the improvement comprises:

a stirrer releasably attachable to the drive unit and projecting downwardly from the drive unit into the container for mixing fluids, said stirrer including an upright releasably attached to the drive unit and a mixing frame extending generally radially from a bottom portion of the upright toward the center of the container, said mixing frame being substantially spaced from the bottom surface of the container;

a wiper carried by the stirrer for flexible movement relative thereto, said wiper (a) being spaced from a positioned generally beneath the mixing frame to contact the container bottom, (b) being positioned in its substantial entirety beneath the mixing frame, and (c) extending generally radially of the container center point and terminating at one end adjacent the container sidewall; and means carried by said stirrer and engaging the container bottom for assisting in stabilizing the stirring device against tilting during its traverse of the container.

2. The stirring device as defined in claim 1, characterized by said wiper including an inverted-V shaped element, the edges of said element engaging the container bottom surface for skimming fluid therefrom, and said inverted-V configuration providing a lift component to the fluid in the region of the container bottom for agitation and mixing.

3. The stirring device as defined in claim 2, characterized by said wiper being connected to the stirrer by a relatively flexible member, said wiper being flexible along its longitudinal axis in the region of said one end for accomodating curved container surfaces.

4. The stirring device as defined in claim 1, characterized by said stirrer upright having a plurality of vertically spaced indents and said drive unit including a beveled locking surface engaging one of said indents to releasably interlock said drive unit and stirrer, wherein said plurality of vertically spaced idents enable said drive unit to be releasably interlocked with said stirrer in a plurality of positions to accomodate various container depths.

5. The stirring device as defined in claim 1, characterized as including a pair of spaced, parallel uprights having a plurality of vertically spaced indents and said drive unit including a pair of beveled locking surfaces engaging a pair of said indents to releasably interlock said drive unit and stirrer, wherein said drive unit may be releasably interlocked with said stirrer in a plurality of positions to accomodate various container depths.

6. The stirring device as defined in claim 5, characterized by said stirrer being formed from a one-piece rod, said rod forming said pair of uprights, said uprights terminating at their lower ends and elbows and said rod forming a generally U-shaped mixing section interconnecting said two elbows, said U-shaped section having different vertical elevations with respect to said container bottom surface to provide mixing at different vertical levels within the fluids.

7. The stirring device as defined in claim 6, characterized by said stabilizing means including a pair of stabilizer legs depending from said generally U-shaped mixing section and engaging the container bottom surface.

8. The stirring device as defined in claim 5, characterized by said drive unit including a hood extension and said beveled locking surfaces being defined in a pair of indents at the intersection of the hood and the drive unit, said hood tapering in width toward its distal end to define spaced, lateral camming surfaces, said hood having a width at its distal end approximately the same as the spacing between the pair of stirrer uprights, such that said hood may be manually inserted between said uprights and said lateral camming surfaces spread the uprights upon further insertion, said uprights snapping into position within the drive unit indents upon full insertion of the hood between the uprights, wherein the beveled locking surfaces may be selectively located within an appropriate set of stirrer indents to releasably interlock the stirrer and drive unit.

9. A mechanical stirring device for mixing fluids in a container having a bottom surface and a side wall terminating in a rim, including a drive unit having a rotary drive member engaging the rim of the container to impart motion to the stirring device within the container, wherein the improvement comprises:

a stirrer releasably attachable to the drive unit and projecting downwardly from the drive unit into the container for mixing fluids, said stirrer including a pair of spaced, parallel uprights releasably attached to the drive unit and a mixing frame extending generally radially from a bottom portion of the uprights toward the center of the container, said mixing frame being spaced from the bottom surface of the container, and said stirrer being formed of a unitary rod, said rod forming said pair of uprights, said uprights terminating at their lower ends in elbows and said rod forming a generally U-shaped mixing section interconnecting said two elbows and defining said mixing frame, said U-shaped section having different vertical elevations with respect to the container bottom surface to provide mixing at different vertical levels within fluids.

10. A mechanical stirring device for mixing fluids in a container having a bottom surface and a sidewall, comprising:

a drive unit supportable on said sidewall and having an output drive member engaging said sidewall to impart motion to the stirring device, said drive unit further including a hood extension and a pair of horizontally spaced beveled surfaces defined in a pair of indents at the intersection of the hood and the drive unit, said hood tapering in width toward its distal end to define spaced, lateral camming surfaces;

a stirrer including a pair of spaced, generally parallel uprights releasably attachable to the drive unit and projecting downwardly from said drive unit into the container, said stirrer further including a mixing frame projecting from said pair of uprights toward the center of the container, said uprights including a plurality of vertically spaced sets of indents for alternatively receiving said pair of beveled surfaces to accomodate attachment of the stirring device to a variety of container sizes, said beveled surfaces seating within one set of said uprights indents to releasably interlock said drive unit to said stirrer; and said hood having a width at its distal end approximately the same as the spacing between the pair of stirrer uprights, such that said hood may be manually inserted between said uprights and said lateral camming surfaces spread the uprights upon further insertion, said uprights snapping into position within the drive unit indents upon full insertion of the hood between the uprights wherein the beveled locking surfaces may be selectively located within an appropriate set of stirrer indents to releasably interlock the stirrer and drive unit.

11. A mechanical stirring device for mixing fluids in a container having a bottom surface and a sidewall comprising:

a drive unit supportable on said sidewall and having an output drive member engaging said sidewall to impart motion to the stirring device, said drive unit including a pair of horizontally spaced beveled surfaces;

a stirrer formed from a one-piece rod, said rod forming a pair of spaced, generally parallel uprights releasably attachable to the drive unit and projecting downwardly from said drive unit into the container, said uprights terminating at their lower ends in elbows, said stirrer further including a generally U-shaped mixing frame formed from said rod and projecting from said pair of uprights toward the center of the container, said U-shaped mixing frame having different vertical elevations with respect to the container bottom to provide mixing at different vertical levels within the fluids, said uprights including a plurality of vertically spaced sets of indents for alternatively receiving said pair of beveled surfaces to accomodate attachment of the stirring device to a variety of container sizes, said beveled surfaces seating within one set of said upright indents to releasably interlock said drive unit to said stirrer, said stirrer further including a wiper element connected to the mixing frame, said wiper element having an inverted V-cross-sectional shape and engaging the bottom surface of the container for skimming fluid therefrom and mixing the fluid in that region.

12. The stirring device as defined in claim 17, further including a pair of stabilizer legs depending from said generally U-shaped mixing section and engaging the container bottom surface to laterally stabilize the stirring device against lateral displacement during its traverse of the container.

13. The stirring device as defined in claim 11, characterized by said stabilizing members having an anti-friction coating where they engage the bottom surface of the container.

* * * * *